(12) United States Patent
Bauco

(10) Patent No.: US 8,197,068 B2
(45) Date of Patent: Jun. 12, 2012

(54) SPECKLE PATTERN SCRAMBLING IN LASER PROJECTION SYSTEMS

(75) Inventor: Anthony Sebastian Bauco, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 301 days.

(21) Appl. No.: 12/714,048

(22) Filed: Feb. 26, 2010

(65) Prior Publication Data

US 2011/0211165 A1 Sep. 1, 2011

(51) Int. Cl.
*G03B 21/14* (2006.01)
(52) U.S. Cl. .......................................................... 353/20
(58) Field of Classification Search .................... 353/20, 353/38; 359/278, 279, 483.01–494.01; 372/21, 372/22
See application file for complete search history.

(56) References Cited

U.S. PATENT DOCUMENTS

| | | | |
|---|---|---|---|
| 6,600,590 B2 | 7/2003 | Roddy et al. | 359/287 |
| 6,956,878 B1 * | 10/2005 | Trisnadi | 372/27 |
| 2008/0297731 A1 * | 12/2008 | Powell et al. | 353/37 |
| 2009/0190618 A1 | 7/2009 | Kuksenkov et al. | 372/33 |

OTHER PUBLICATIONS

Domanski, *Depolarization of Partially Coherent Light in Liquid Crystals*, Opto-Electronics Review, vol. 14, No. 4, 2006, pp. 305-310.

Gauza, *Super High Birefringence Isothiocyanato Biphenyl-Bistolane Liquid Crystals*, Japanese Journal of Applied Physics, vol. 43, No. 11A 2004 pp. 7634-7638.

\* cited by examiner

*Primary Examiner* — Georgia Y Epps
*Assistant Examiner* — Renee Naphas
(74) *Attorney, Agent, or Firm* — Gregory V. Bean

(57) ABSTRACT

A laser projection system is provided comprising a light source, a phase retarding element, and a beam scanning element. The light source comprises at least one frequency-converted laser source comprising a wavelength-tunable laser diode and a wavelength conversion device. The phase retarding element is configured to resolve the polarization of a frequency-converted laser beam into two orthogonal linearly polarized components such that one component of polarization is phase delayed relative to the other. Frequency-converted laser beam polarization in the 2D image frame is a function of the degree to which the respective components of polarization are delayed relative to each other and varies with wavelength variations in the output of the wavelength-tunable laser diode. Polarization variations of the frequency-converted laser beam in the 2D image frame are sufficient to scramble image speckle patterns across the 2D image frame. In another embodiment of the present disclosure a laser projection system is provided where the system comprises a wavelength-tunable laser diode comprising a phase control section. The laser projection system is programmed to apply a dither signal to the phase control section and the dither signal introduces wavelength variations in the output of the wavelength-tunable laser diode. The wavelength variations in the output of the wavelength-tunable laser diode reside within a FWHM conversion bandwidth of the wavelength conversion device and are at a rate that is sufficient to scramble pixel-specific polarizations and image speckle patterns across the 2D image frame. Methods of operating laser projection systems are also provided.

20 Claims, 2 Drawing Sheets

SPECKLE PATTERN SCRAMBLING IN LASER PROJECTION SYSTEMS

BACKGROUND

The present disclosure relates to laser projection systems and, more specifically, to laser projection systems that are configured to wash out speckle patterns in a projected laser image.

BRIEF SUMMARY

Image speckle arises in laser projection systems when the coherent light scattered from an image projection screen interferes constructively or destructively with itself. This interference produces a granular intensity pattern known as image speckle. In a laser projection system, the presence of speckle patterns and image speckle in general tends to increase noise and mask image information. The present disclosure presents systems and methods for reducing the harmful effects of image speckle in laser projection. Systems and methods disclosed herein are particularly well-suited for applications that require compact green lasers for use as the green light source of high resolution 2D scanning-type portable projectors.

In accordance with one embodiment of the present disclosure, a laser projection system is provided comprising a light source, a phase retarding element, and a beam scanning element. The light source comprises at least one frequency-converted laser source comprising a wavelength-tunable laser diode and a wavelength conversion device. The phase retarding element is configured to resolve the polarization of a frequency-converted laser beam into two orthogonal linearly polarized components such that one component of polarization is phase delayed relative to the other. Frequency-converted laser beam polarization in the 2D image frame is a function of the degree to which the respective components of polarization are delayed relative to each other and varies with wavelength variations in the output of the wavelength-tunable laser diode. Polarization variations of the frequency-converted laser beam in the 2D image frame are sufficient to scramble image speckle patterns across the 2D image frame.

In accordance with another embodiment of the present disclosure a laser projection system is provided where the system comprises a wavelength-tunable laser diode comprising a phase control section. The laser projection system is programmed to apply a dither signal to the phase control section and the dither signal introduces wavelength variations in the output of the wavelength-tunable laser diode. The wavelength variations in the output of the wavelength-tunable laser diode reside within a FWHM conversion bandwidth of the wavelength conversion device and are at a rate that is sufficient to scramble pixel-specific polarizations and image speckle patterns across the 2D image frame.

Methods of operating laser projection systems are also provided.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
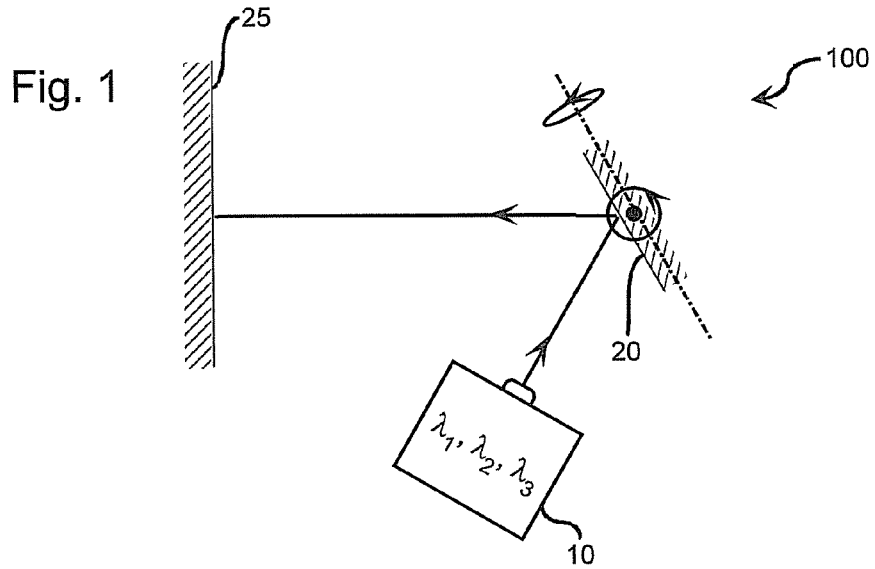
FIG. 1 is a schematic illustration of some of the components of a laser projection system.

Referring initially to FIG. 1, a laser projection system 100 comprising a light source 10 and a beam scanning element 20 is illustrated. The beam scanning element 20 is configured to scan a light beam emanating from the light source 10 across a 2D image frame on a projection screen 25. The light source 10 may comprise a single light source component, e.g., a red, green, or blue laser source, or multiple light source components, e.g., a multicolor RGB source. Laser scanning projectors typically require a high degree of spatial coherence to achieve the requisite image resolution. For high spatial coherence, independent laser sources are typically required for each color used in the projection, e.g., red, green and blue.

For green lasers, the light source typically utilizes nonlinear frequency conversion methods. According to these methods, a laser emitting at a shorter or longer wavelength is converted to the desired wavelength though frequency conversion methods such as second harmonic generation (SHG), optical parametric oscillation (OPO), or frequency mixing. In the context of second harmonic generation (SHG), a waveguide can be patterned onto a nonlinear crystal and the output of a single mode IR laser is coupled into the waveguide and converted to a coherent single mode green laser output. The green mode that is transmitted from the waveguide is extremely coherent in both the spatial and temporal domains. The high spatial and temporal coherence contributes to a relatively large amount of image speckle in the projected image. Speckle, resulting from the optical interference of the beam with itself, is perceived as image noise.

The aforementioned interference is dependent on the polarization state of the beam and that the output of SHG crystals and other types of wavelength conversion devices have a high degree of polarization. Because the speckle field and pattern will vary with polarization, perceived speckle patterns can be reduced by scrambling the polarization of a beam originating from a wavelength conversion device, such as an SHG crystal. Particular aspects of the present disclosure focus on polarization scrambling by placing a phase retarding element in the optical path of a frequency-converted laser source.

Generally, a phase retarding element manipulates polarized light by making the optical path length for one orthogonal polarization different than the other. For example, in the context of a ¼ wave retarder, if two orthogonal components are approximately equivalent, a phase shift in one of the components will result in circularly polarized light. More specifically, ¼ wave retarders have the unique property of turning elliptically polarized light into linearly polarized light or of transforming linearly polarized light into circularly polarized light when the fast axis of the quarter wave plate is placed at 45° to the incoming polarization plane. This is done using birefringent, uniaxial materials having two different refractive indices. Light polarized along the direction with the smaller index travels faster and thus this axis is termed the fast axis. The other axis is termed the slow axis. A retarder that produces a λ/2 phase shift is known as a half wave retarder. Half wave retarders can rotate the polarization of linearly polarized light to twice the angle between the retarder fast axis and the plane of polarization. Placing the fast axis of a half wave retarder at 45° to the polarization plane results in a polarization rotation of 90°. For example, and not by way of limitation, a phase retarding element may comprise a stationary waveplate with a relatively high birefringence, defining a fast axis oriented at approximately 45 degrees relative to the frequency-converted laser beam polarization plane.

Figure 2:
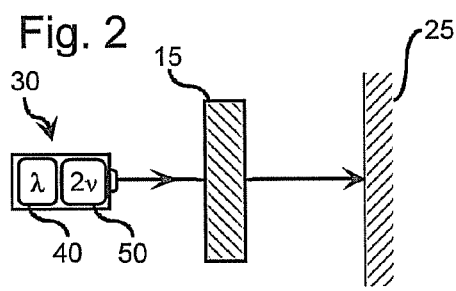
FIG. 2 is a schematic illustration of a light source, phase retarding element, and projection screen according to one embodiment of the present disclosure.

For example, according to the embodiment illustrated in FIG. 2, a frequency-converted laser source 30 is illustrated and comprises a wavelength-tunable laser diode 40 and a wavelength conversion device 50. The phase retarding element 15 is also illustrated. The frequency-converted laser source 30 is typically utilized to generate a frequency-converted laser beam in the green spectrum. In such case, the laser diode 40 operates in the IR portion of the optical spectrum and the wavelength conversion device 50 comprises a nonlinear optical crystal, such as a Mg-O doped periodically poled lithium niobate (PPLN) crystal, and is used to convert the infrared light emission of a laser diode 40 into visible green light. It is contemplated that embodiments of the present disclosure will be applicable to a variety of emission wavelengths with a variety of laser diode and wavelength conversion configurations, including $2^{nd}$ and higher-order harmonic generation.

A frequency-converted laser beam emanating along an optical axis from an output of the wavelength conversion device 50 will have a high degree of polarization, relative to the degree of polarization of an input laser beam entering an input of the wavelength conversion device 50. The phase retarding element 15 resolves the polarization of the frequency-converted laser beam into two orthogonal linearly polarized components such that one component of polarization is phase delayed relative to the other. The present inventor has recognized that the polarization of the frequency-converted laser beam at the projection screen 25 is a function of the degree to which the respective components of polarization are delayed relative to each other and varies with the wavelength of the output of the laser diode 40. The present inventor has also recognized that if the polarization of a particular pixel or group of pixels is varied from frame to frame, then the speckle patterns observed by a viewer will be less recognizable. Accordingly, wavelength variations in the laser diode output can be used to generate polarization variations in the 2D image frame and to scramble image speckle patterns across the 2D image frame.

Although there are a variety of ways to vary the wavelength of a particular laser source, it is contemplated that the wavelength-tunable laser diode 40 may comprise a wavelength selective section, phase control section, or both, as would be the case with a two or three section DBR laser diode, the structural details of which may be gleaned from a variety of publications in the art including, for example, US 2010/0002736 A1 and US 2009/0252187 A1, the relevant portions of which are incorporated herein by reference. Where the wavelength-tunable laser diode 40 comprises a phase control section, the laser projection system 100 can be programmed to apply a phase shifting signal, as described in US 2009-0129414 A1 (the relevant disclosure of which is incorporated herein by reference), a phase perturbation signal, as described in U.S. Pat. No. 7,420,997 (the relevant disclosure of which is incorporated herein by reference), or some other type of phase dither signal to the phase control section. These types of dither signals are typically spaced at less than approximately 1 nm and can be used to introduce wavelength variations in the output of the wavelength-tunable laser diode 40 that are sufficient to introduce the aforementioned polarization variations across the 2D image frame.

Alternatively, where the wavelength-tunable laser diode 40 comprises a wavelength selective section, the laser projection system 100 can be programmed to apply a dither signal to the wavelength selective section. The dither signal can be fashioned to introduce wavelength variations in the output of the wavelength-tunable laser diode 40 that are sufficient to introduce the aforementioned polarization variations across the 2D image frame.

Preferably, although not required, the wavelength variations in the output of the wavelength-tunable laser diode 40 are introduced at a rate that is sufficient to scramble pixel-specific polarizations across successive 2D image frames such that the polarization of a particular pixel varies from frame to frame. To enhance scrambling, it may be preferable to ensure that the wavelength variations in the output of the wavelength-tunable laser diode 40 are selected to reside within the full-width-half-maximum (FWHM) conversion bandwidth of the wavelength conversion device 50. It is contemplated that sufficient scrambling will be achieved when there is no recognizable gradient, periodicity, or pattern to the pixel-specific polarizations across a plurality of successive image frames.

Regardless of the manner in which wavelength variations are introduced in the output of the wavelength-tunable laser diode 40, the phase delay introduced by the phase retarding element 15 can be described as comprising a "dithered" component that is a function of wavelength variations in the output of the wavelength-tunable laser diode. The dithered component of the phase delay can be defined as follows:

$$\Delta\phi = 2\pi\Delta nt/\lambda \text{ and } d\Delta\phi = -\frac{2\pi\Delta nt}{\lambda^2}d\lambda$$

such that, for a 2π change in phase delay across the 2D image frame, $$t = \frac{\lambda^2}{\Delta n d\lambda}$$

where Δϕ represents the dithered component of the phase delay, Δn represents the birefringence of the phase retarding element, t represents the optical path thickness of the phase retarding element, and λ represents the wavelength of the frequency-converted laser beam. Typically, the birefringence and thickness of the phase retarding element 15 will be selected such that the dithered component of the phase delay accounts for at least a 2π change in phase delay across the 2D image frame. For example, it is contemplated that wavelength variations less than 0.1 nm in the output of the wavelength-tunable laser diode 40 will be sufficient for the phase retarding element to introduce at least a 2π change in phase delay across the 2D image frame.

Figure 3:
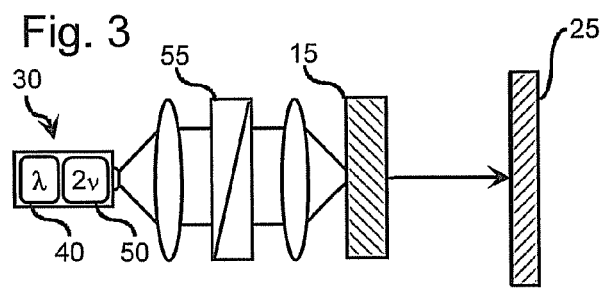
FIGS. 3 and 4 are schematic illustrations of a light source, spatial depolarizing element, phase retarding element, and projection screen according to additional embodiments of the present disclosure.

Comparing FIGS. 2 and 3, it is contemplated that either the phase retarding element 15 or a spatial depolarizing element 55 can be configured to define an optical path thickness that varies across a beam aperture of the frequency-converted laser beam. The varying optical path will vary polarization across the beam aperture of the frequency-converted laser beam. For example, and not by way of limitation, the phase retarding element 15 can be provided with a stationary wedge shape cross section. Alternatively, as is illustrated schematically in FIG. 3, a spatial depolarizing element 55 defining an optical path thickness that varies across the beam aperture of the frequency-converted laser beam can be provided downstream of the frequency-converted laser source 30 and upstream of the phase retarding element 15.

In either case, it is contemplated that the variation in polarization across the beam aperture of the frequency-converted laser beam should be sufficient to account for at least a $2\pi$ change in phase delay across the aperture of the frequency-converted laser beam. The variation can be defined as follows:

$$d\Delta\phi = -\frac{2\pi\Delta n}{\lambda}dt$$

such that, for a $2\pi$ change in phase delay across an aperture of the frequency-converted laser beam, $$dt = \frac{\lambda}{\Delta n}$$

where $\Delta\phi$ represents the dithered component of the phase delay, $\Delta n$ represents the birefringence of the phase retarding element or the spatial depolarizing element, dt represents the change in optical path thickness of the phase retarding element or the spatial depolarizing element across the beam aperture of the frequency-converted laser beam, and $\lambda$ represents the wavelength of the frequency-converted laser beam.

Figure 4:
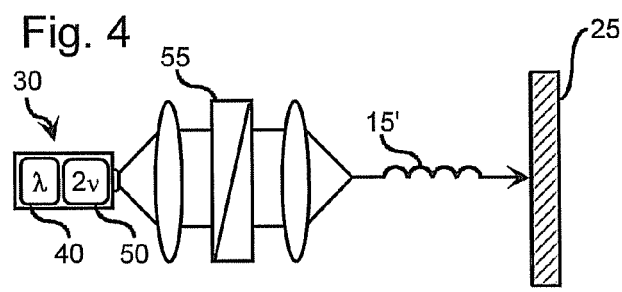

In embodiments where a relatively compact optical package is preferred, the phase retarding element 15 is characterized by a birefringence that is high enough for the introduction of the aforementioned $2\pi$ change in phase delay with a waveplate thickness of less than approximately 10 mm. For example, it is contemplated that waveplates comprising Isothiocyanato Biphenyl-Bistolane liquid crystals or other linearly conjugated molecules may be utilized in this regard. Alternatively, as is illustrated in FIG. 4, it is contemplated that the phase retarding element 15' may take the form of a polarization maintaining optical fiber, which have a relatively strong built-in birefringences and are particularly well-suited for compact optical packages because polarization can be preserved even if the fiber is bent or coiled into a compact package.

Figure 5:
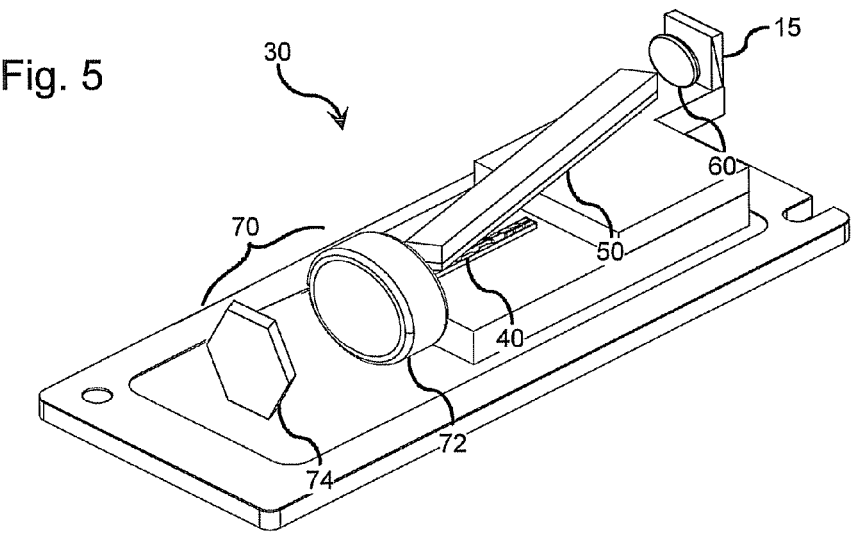
FIG. 5 is a schematic illustration of a folded-path frequency-converted laser source according to the present disclosure.
Figure 6:
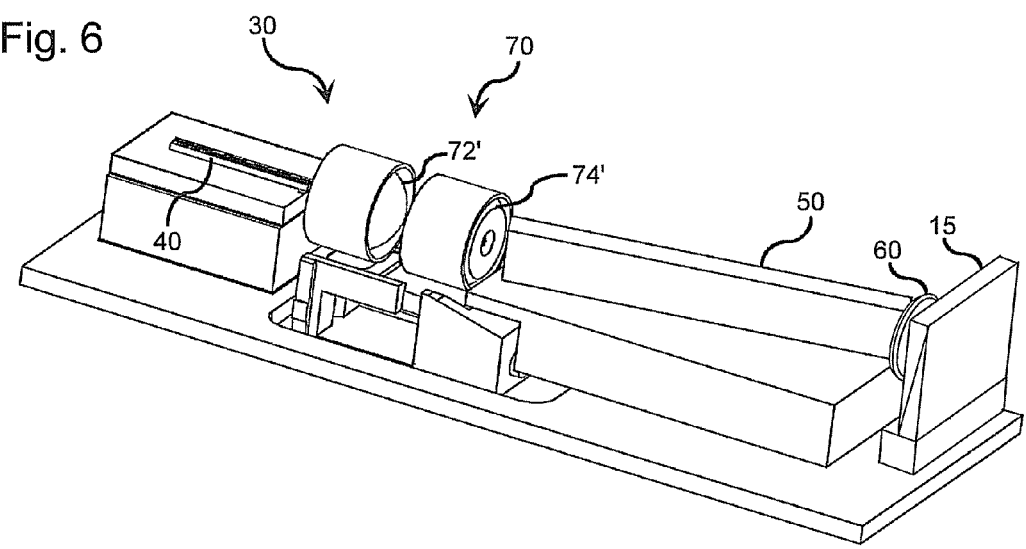
FIG. 6 is a schematic illustration of an alternative frequency-converted laser source according to the present disclosure.

Referring to FIGS. 5 and 6, a frequency-converted laser source 30 and an associated phase retarding element 15 are illustrated in a folded optical configuration (see FIG. 5) and a uni-directional optical configuration (see FIG. 6). In each case, the frequency-converted laser source 30 comprises a wavelength-tunable laser diode 40 and a wavelength conversion device 50. The phase retarding element 15 and a collimating lens 60 are also illustrated. In FIG. 5, the frequency-converted laser source 30 comprises coupling optics 70 which, in the context of a folded path laser source 30, comprises a lens component 72 and a reflective surface 74 that cooperate to define a folded optical path extending from the laser diode 40 to the wavelength conversion device 50. In operation, the reflective surface 74 can be controlled via suitable actuators to control the position of a beam spot on an input face of the wavelength conversion device 50. In FIG. 3, the coupling optics 70' comprises one or more lens components 72', 74' that are positioned along a uni-directional optical path extending from the laser diode 40 to the wavelength conversion device 50. In any case, whatever optical components are provided, the laser source 30, 30' will typically also comprise an adaptive optics assembly that is configured to alter the optical path extending from the laser diode 40 to the wavelength conversion device 50 by changing the position of one of the optical components in the optical path.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "programmed" in a particular way, "configured" or "programmed" to embody a particular property, or function in a particular manner, are structural recitations, as opposed to recitations of intended use. More specifically, the references herein to the manner in which a component is "programmed" or "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the term "approximately" is utilized herein to represent the inherent degree of uncertainty that may be attributed to any quantitative comparison, value, measurement, or other representation. The term "approximately" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various inventions described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A laser projection system comprising a light source, a phase retarding element, and a beam scanning element, wherein:
the beam scanning element is configured to scan a light beam emanating from the light source across a 2D image frame;
the light source comprises at least one frequency-converted laser source comprising a wavelength-tunable laser diode and a wavelength conversion device;
the wavelength conversion device of the frequency-converted laser source is configured such that
a frequency-converted laser beam emanating along an optical axis from an output of the wavelength conversion device is characterized by a high degree of polarization, relative to a degree of polarization of an input laser beam entering an input of the wavelength conversion device, and
wavelength variations in an output of the wavelength-tunable laser diode are manifested as frequency-converted wavelength variations in the frequency-converted laser beam;
the phase retarding element is further configured to resolve the polarization of the frequency-converted laser beam into two orthogonal linearly polarized components such that one component of polarization is phase delayed relative to the other;
frequency-converted laser beam polarization in the 2D image frame is a function of the degree to which the respective components of polarization are delayed relative to each other and varies with wavelength variations in the output of the wavelength-tunable laser diode; and
the polarization variations of the frequency-converted laser beam in the 2D image frame are sufficient to scramble image speckle patterns across the 2D image frame.

2. A laser projection system as claimed in claim 1 wherein the phase delay introduced by the phase retarding element comprises a dithered component that is a function of wavelength variations in the output of the wavelength-tunable laser diode.

3. A laser projection system as claimed in claim 2 wherein the phase retarding element is configured such that the dithered component of the phase delay is defined as follows:

$$\Delta\phi = 2\pi\Delta n t / \lambda \text{ and } d\Delta\phi = -\frac{2\pi\Delta n t}{\lambda^2} d\lambda$$

such that, for a $2\pi$ change in phase delay across the 2D image frame, $$t = \frac{\lambda^2}{\Delta n d\lambda}$$

where $\Delta\phi$ represents the dithered component of the phase delay, $\Delta n$ represents the birefringence of the phase retarding element, t represents the optical path thickness of the phase retarding element, and $\lambda$ represents the wavelength of the frequency-converted laser beam.

4. A laser projection system as claimed in claim 2 wherein the dithered component of the phase delay accounts for at least a $2\pi$ change in phase delay across the 2D image frame.

5. A laser projection system as claimed in claim 4 wherein the phase retarding element is configured such that wavelength variations less than 0.1 nm in the output of the wavelength-tunable laser diode are sufficient for the phase retarding element to introduce at least a $2\pi$ change in phase delay across the 2D image frame.

6. A laser projection system as claimed in claim 5 wherein the phase retarding element comprises a liquid crystal waveplate or a polarization maintaining optical fiber.

7. A laser projection system as claimed in claim 1 wherein the phase retarding element or a spatial depolarizing element of the laser projection system defines an optical path thickness that varies across a beam aperture of the frequency-converted laser beam to vary polarization across a beam aperture of the frequency-converted laser beam.

8. A laser projection system as claimed in claim 7 wherein:
the phase retarding element is provided with a stationary wedge shape cross section; and
the varying optical path thickness is attributable to the stationary wedge shape cross section of the phase retarding element.

9. A laser projection system as claimed in claim 7 further comprising a spatial depolarizing element provided downstream of the frequency-converted laser source and upstream of the phase retarding element, wherein the spatial depolarizing element of the laser projection system defines an optical path thickness that varies across a beam aperture of the frequency-converted laser beam.

10. A laser projection system as claimed in claim 7 wherein the variation in polarization across the beam aperture of the frequency-converted laser beam accounts for at least a $2\pi$ change in phase delay across an aperture of the frequency-converted laser beam and is defined as follows:

$$d\Delta\phi = -\frac{2\pi\Delta n}{\lambda} dt$$

such that, for a $2\pi$ change in phase delay across an aperture of the frequency-converted laser beam, $$dt = \frac{\lambda}{\Delta n}$$

where $\Delta\phi$ represents the dithered component of the phase delay, $\Delta n$ represents the birefringence of the phase retarding element or the spatial depolarizing element, dt represents the change in optical path thickness of the phase retarding element or the spatial depolarizing element across the beam aperture of the frequency-converted laser beam, and $\lambda$ represents the wavelength of the frequency-converted laser beam.

11. A laser projection system as claimed in claim 1 wherein the phase retarding element comprises a fast axis oriented at approximately 45 degrees relative to the frequency-converted laser beam polarization plane.

12. A laser projection system as claimed in claim 1 wherein the phase retarding element comprises a stationary waveplate characterized by a birefringence that is high enough for the introduction of a $2\pi$ change in phase delay with a waveplate thickness of less than approximately 10 mm.

13. A laser projection system as claimed in claim 1 wherein the wavelength-tunable laser diode comprises a wavelength selective section, phase control section, or both.

14. A laser projection system as claimed in claim 1 wherein:
the wavelength-tunable laser diode comprises a phase control section;
the laser projection system is programmed to apply a dither signal to the phase control section; and
the dither signal introduces wavelength variations in the output of the wavelength-tunable laser diode that are sufficient for a phase delay introduced by the phase retarding element to comprise a dithered component accounting for at least a $2\pi$ change in phase delay across the 2D image frame.

15. A laser projection system as claimed in claim 1 wherein:
the wavelength-tunable laser diode comprises a wavelength selective section;
the laser projection system is programmed to apply a dither signal to the wavelength selective section; and
the dither signal introduces wavelength variations in the output of the wavelength-tunable laser diode that are sufficient for a phase delay introduced by the phase retarding element to comprise a dithered component accounting for at least a $2\pi$ change in phase delay across the 2D image frame.

16. A laser projection system as claimed in claim 1 wherein the wavelength variations in the output of the wavelength-tunable laser diode are at a rate that is sufficient to scramble pixel-specific polarizations across successive 2D image frames.

17. A laser projection system as claimed in claim 1 wherein the wavelength variations in the output of the wavelength-tunable laser diode reside within a FWHM conversion bandwidth of the wavelength conversion device.

18. A laser projection system as claimed in claim 1 wherein the wavelength variations in the output of the wavelength-tunable laser diode are less than approximately 1 nm.

19. A laser projection system comprising a light source, a phase retarding element, and a beam scanning element, wherein:
the beam scanning element is configured to scan a light beam emanating from the light source across a 2D image frame;
the light source comprises at least one frequency-converted laser source comprising a wavelength-tunable laser diode and a wavelength conversion device;
the wavelength-tunable laser diode comprises a phase control section and the laser projection system is programmed to apply a dither signal to the phase control section;
the dither signal introduces wavelength variations in the output of the wavelength-tunable laser diode;
the wavelength conversion device of the frequency-converted laser source is configured such that
a frequency-converted laser beam emanating along an optical axis from an output of the wavelength conversion device is characterized by a high degree of polarization, relative to a degree of polarization of an input laser beam entering an input of the wavelength conversion device, and
the wavelength variations in an output of the wavelength-tunable laser diode are manifested as frequency-converted wavelength variations in the frequency-converted laser beam;
the phase retarding element is configured to resolve the polarization of the frequency-converted laser beam into two orthogonal linearly polarized components such that one component of polarization is phase delayed relative to the other;
frequency-converted laser beam polarization in the 2D image frame is a function of the degree to which the respective components of polarization are delayed relative to each other and varies with the wavelength variations in the output of the wavelength-tunable laser diode;
the wavelength variations in the output of the wavelength-tunable laser diode reside within a FWHM conversion bandwidth of the wavelength conversion device and are at a rate that is sufficient to scramble pixel-specific polarizations and image speckle patterns across the 2D image frame.

20. A method of operating a laser projection system comprising a light source, a phase retarding element, and a beam scanning element, wherein the method comprises:
operating the light source and the beam scanning element to scan a light beam emanating from the light source across a 2D image frame, wherein
the light source comprises at least one frequency-converted laser source comprising a wavelength-tunable laser diode for generating an input laser beam and a wavelength conversion device,
the wavelength conversion device of the frequency-converted laser source is configured such that a frequency-converted laser beam emanating along an optical axis from an output of the wavelength conversion device is characterized by a high degree of polarization, relative to a degree of polarization of the input laser beam entering an input of the wavelength conversion device, and
the phase retarding element is further configured to resolve the polarization of the frequency-converted laser beam into two orthogonal linearly polarized components such that one component of polarization is phase delayed relative to the other;
introducing wavelength variations in the input laser beam such that the wavelength variations are manifested as frequency-converted wavelength variations in the frequency-converted laser beam, wherein
frequency-converted laser beam polarization in the 2D image frame is a function of the degree to which the respective components of polarization are delayed relative to each other and varies with wavelength variations in the output of the wavelength-tunable laser diode, and
the polarization variations of the frequency-converted laser beam in the 2D image frame are sufficient to scramble image speckle patterns across the 2D image frame.

* * * * *